July 7, 1931.  W. C. GEWALT  1,813,286
CLUTCH
Filed Nov. 9, 1928
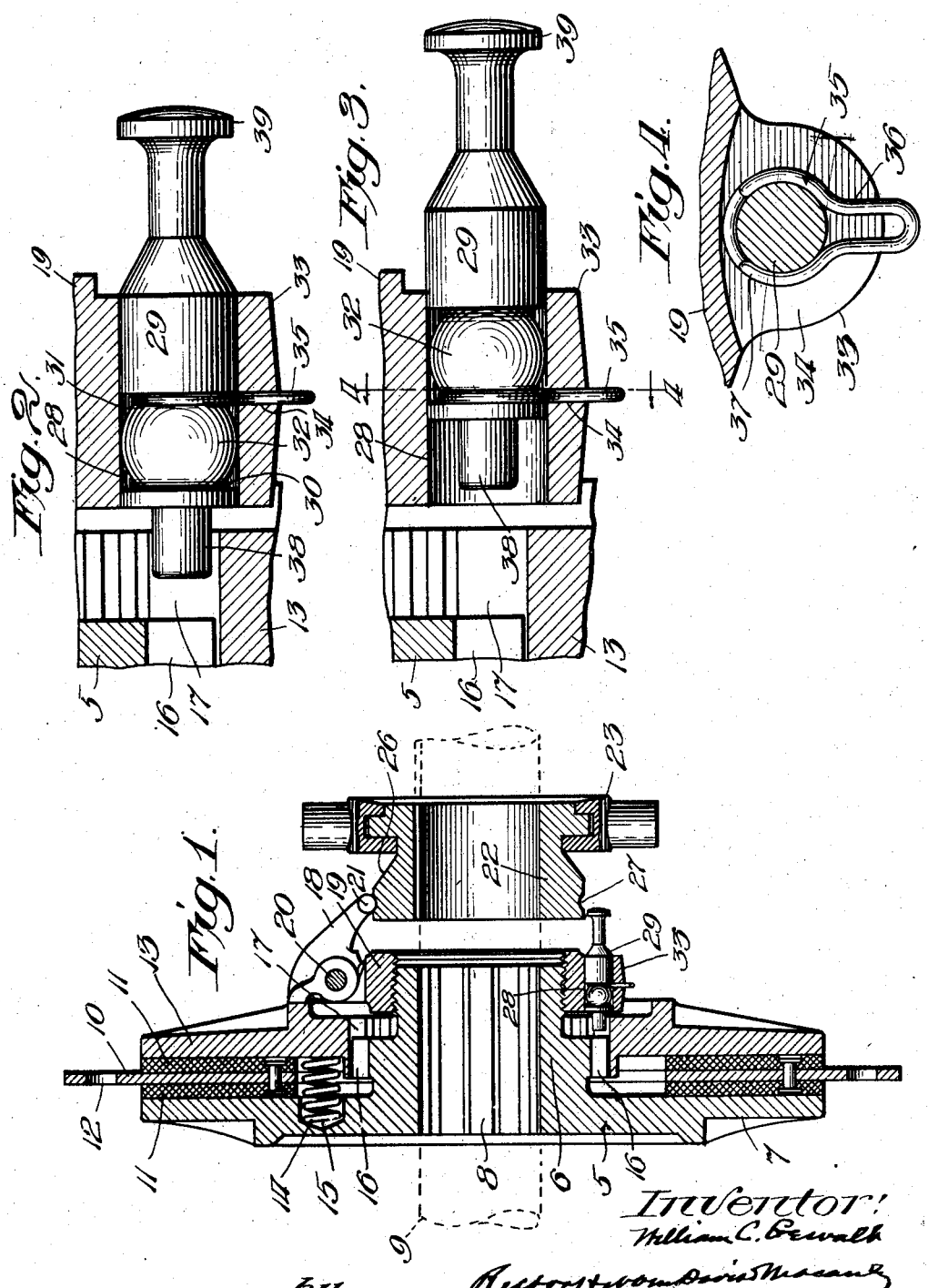

Patented July 7, 1931

1,813,286

UNITED STATES PATENT OFFICE

WILLIAM C. GEWALT, OF RACINE, WISCONSIN, ASSIGNOR TO TWIN DISC CLUTCH COMPANY, OF RACINE, WISCONSIN, A CORPORATION OF WISCONSIN

CLUTCH

Application filed November 9, 1928. Serial No. 318,133.

My invention relates to the well-known type of clutch in which a friction disk or plate connected to one rotary part, as for example, the flywheel of an engine, is clamped between clamp disks arranged respectively on opposite sides of the friction plate and movable relative thereto for the purpose of closing and opening the clutch. The present invention relates more particularly to convenient means for adjusting the clutch to compensate for wear, etc.

In the drawings accompanying and forming a part of this application, Fig. 1 is a diametric view of a clutch embodying my invention;

Fig. 2 is an enlarged section, partly in elevation, of the detail of the clutch to which my invention relates;

Fig. 3 is a view similar to Fig. 2 but showing the parts in a different relation; and Fig. 4 is a transverse section on the plane of the line 4—4 of Fig. 3.

Referring more particularly to Fig. 1, 5 is a clamping plate comprising a hub 6, and a flange or disk 7, the hub being provided with keyways 8 by which it may be keyed to a shaft 9, shown in dotted lines. The friction disk 10 is provided on opposite sides with a friction material 11 and formed with an annular series of holes 12 by means of which it may be bolted to a flywheel or the like. A second clamping disk 13 engages the other side of the friction disk, there being a series of springs 14 intermediate the two clamping members for forcing the latter away from the friction disk. The clamping member 5 is formed with an annular series of pockets 15 to receive the springs.

Member 5 is also formed with an annular series of ribs 16 which cooperate with similar ribs 17 formed in the inner periphery of the annular opening through clamping disk 13. Thus the two clamping disks are free to move toward and from each other axially but prevented from relative turning movement. An annular series of levers 18 is mounted on a fulcrum ring 19 provided with lugs for the purpose, the pivot pin of one of the levers being shown at 20. The fulcrum ring 19 is interiorly threaded at 21 to engage a thread on the outside of the hub 6 for adjustment toward and from the clamping plates. The levers 18 are engaged at their outer ends 21 by an actuating ring 22 which is axially adjustable upon the shaft 9. I have shown this ring 22 as engaged in the usual manner by a collar 23 provided with lugs 24 for engagement with the usual lever for shifting the collar and hence the ring 22 axially. The outside of the ring 22 is so formed that when it is thrust to the left, as seen in Fig. 1, the ends 21 of the levers ride down the conical surface 26 and the pressure on the clamping disks 13 is thus relieved to permit the clutch to open. When the ring 22 is thrown to the right the ends of the levers ride up the conical surface of the ring and drop into the shallow groove 27, thus holding the levers releasably in the position shown in Fig. 1 in which the clutch is closed. The construction as thus far described was old prior to the present invention which relates to the means for locking the fulcrum ring 19 in adjusted position. The ring 19 is bored at 28 to receive a locking pin 29 which, when in the position shown in Figs. 1 and 2 engages between adjacent ribs 17 on the clamping disk 13 and thus holds the fulcrum ring in adjusted position and prevents it from turning. In order to releasably hold the locking pin 29 in either of its two adjusted positions it is formed with a pair of grooves 30—31, the adjacent walls of which are chamfered or eased away to form an intermediate globular portion 32. Preferably, the fulcrum ring is formed with a boss or enlargement 33 in which the bore 28 is formed. The boss is slit or slotted transversely of the ring as at 34, the slit being of sufficient width to receive and permit free movement of a spring 35 therein. The spring 29 is approximately hairpin-shape at 36 but the ends thereof at 37 are curved outward and then inward so as to closely embrace the reduced portion of pins 29 at the bottoms of the respective grooves. The end 38 of the pin is reduced so that it may be readily received in the groove between teeth or ribs 17 and the other end of the pin is formed with a handle or finger piece 39.

It will be obvious that by exerting sufficient pressure the pin may be thrust inward from the position shown in Fig. 3 to that shown in Fig. 2, the spring yielding to permit the enlarged or globular portion 32 of the pin to pass between the ends of the spring. Likewise, when the pin is pulled outward with sufficient force the spring yields to permit the globular portion 32 to pass and the pin to return to the position shown in Fig. 3.

In adjusting the clutch the pin is first drawn out into the position shown in Fig. 3 and then the fulcrum ring turned until it has been adjusted to a position such that the levers 18 will exert the proper pressure on the clamping disk 13. The ring is turned until the pin is brought into registry with one of the grooves in the inner periphery of the clamping disk 13 and then pressed inwardly into the position shown in Figs. 1 and 2 to lock the ring against accidental turning.

I claim:

In a device of the class described a pair of members angularly adjustable with respect to each other, one of said members having an annular concentric series of recesses and the other of said members a bore adapted to be brought into registry with any one of said recesses as said members are relatively rotated, the last mentioned member being also slitted on a plane substantially perpendicular to said bore, a locking pin in said bore adapted to slide therein into an inner position in which it engages one of said recesses and into an outer position in which it is out of engagement with the first-mentioned member, said pin being formed with circumferential spaced grooves and an intermediate enlargement tapered toward the respective grooves, and a bifurcated spring member anchored against movement longitudinally of the pin in the slit in the last-mentioned member and engaging the pin on opposite sides thereof and adapted to yieldingly hold the pin either in the locking or in the unlocked position.

In testimony whereof, I have subscribed my name.

WILLIAM C. GEWALT.